May 22, 1951      H. J. McCREARY      2,554,113
HEARING AID APPARATUS
Filed March 2, 1948      8 Sheets-Sheet 1
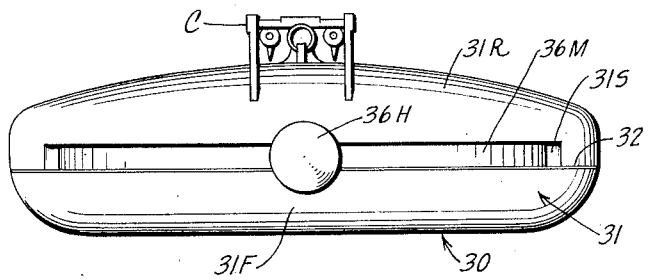
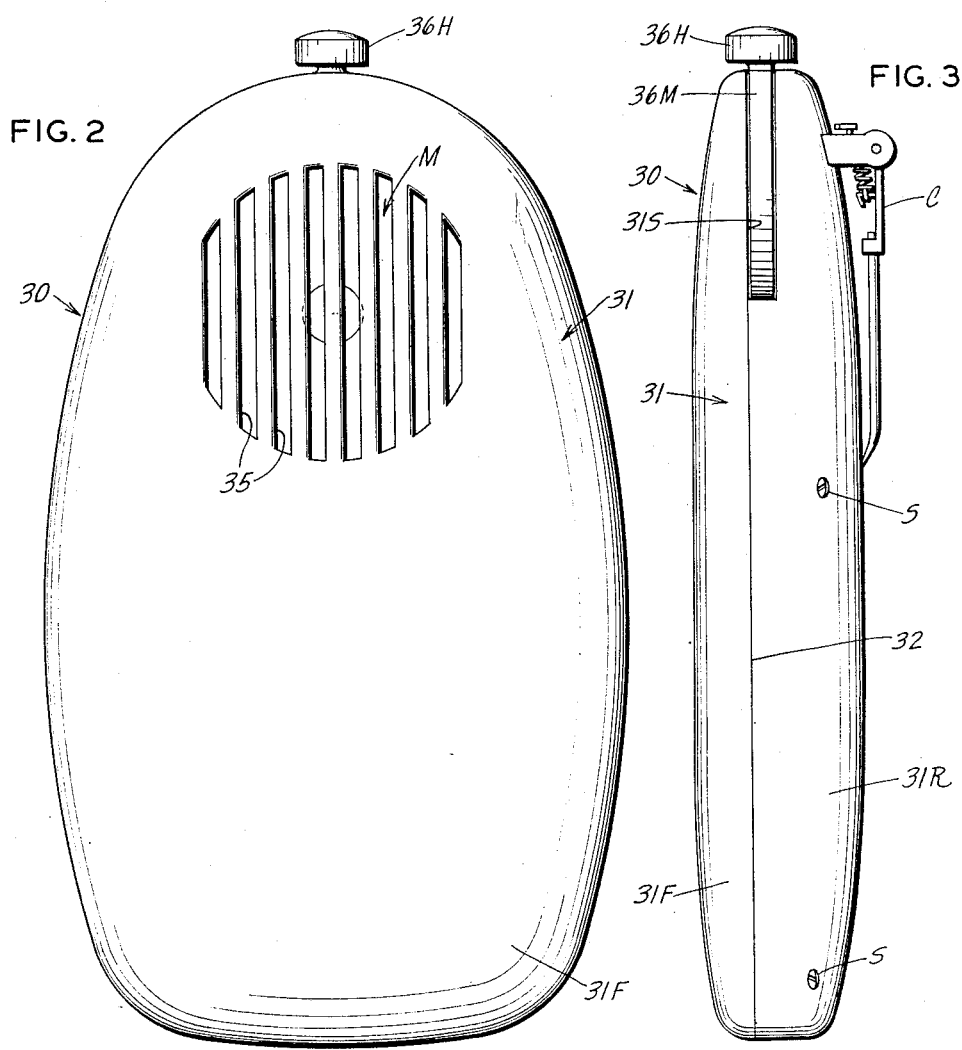
INVENTOR.
HAROLD J. McCREARY
BY Ferd Bing
ATTORNEY

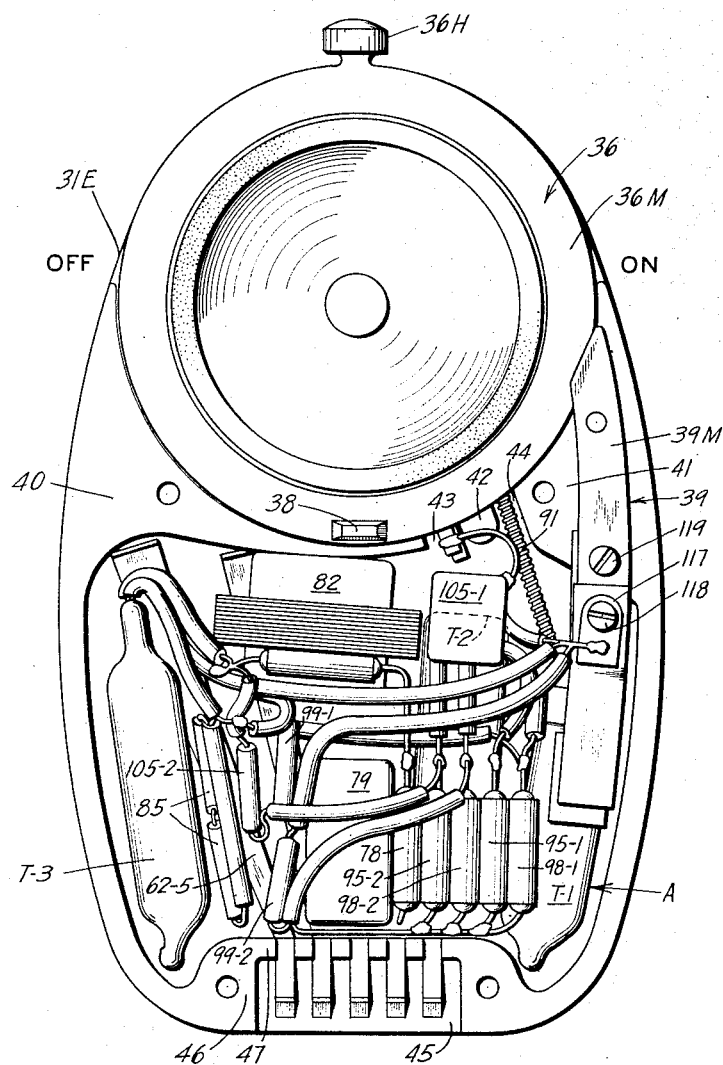

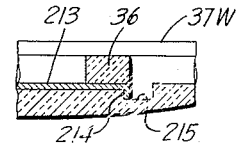
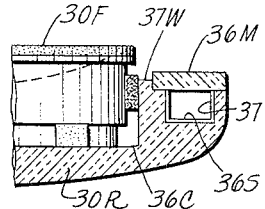
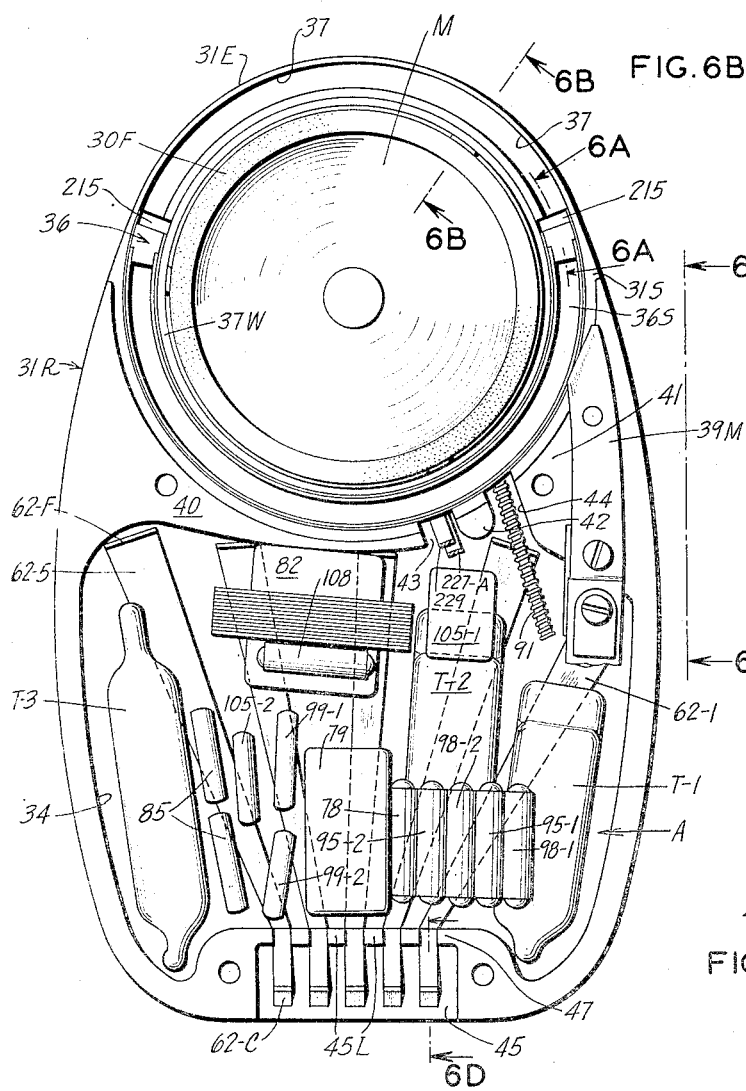
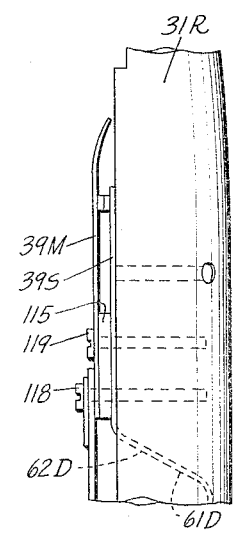
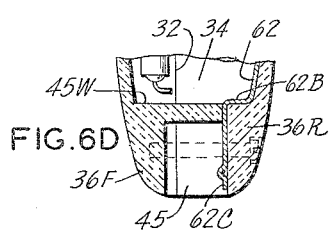

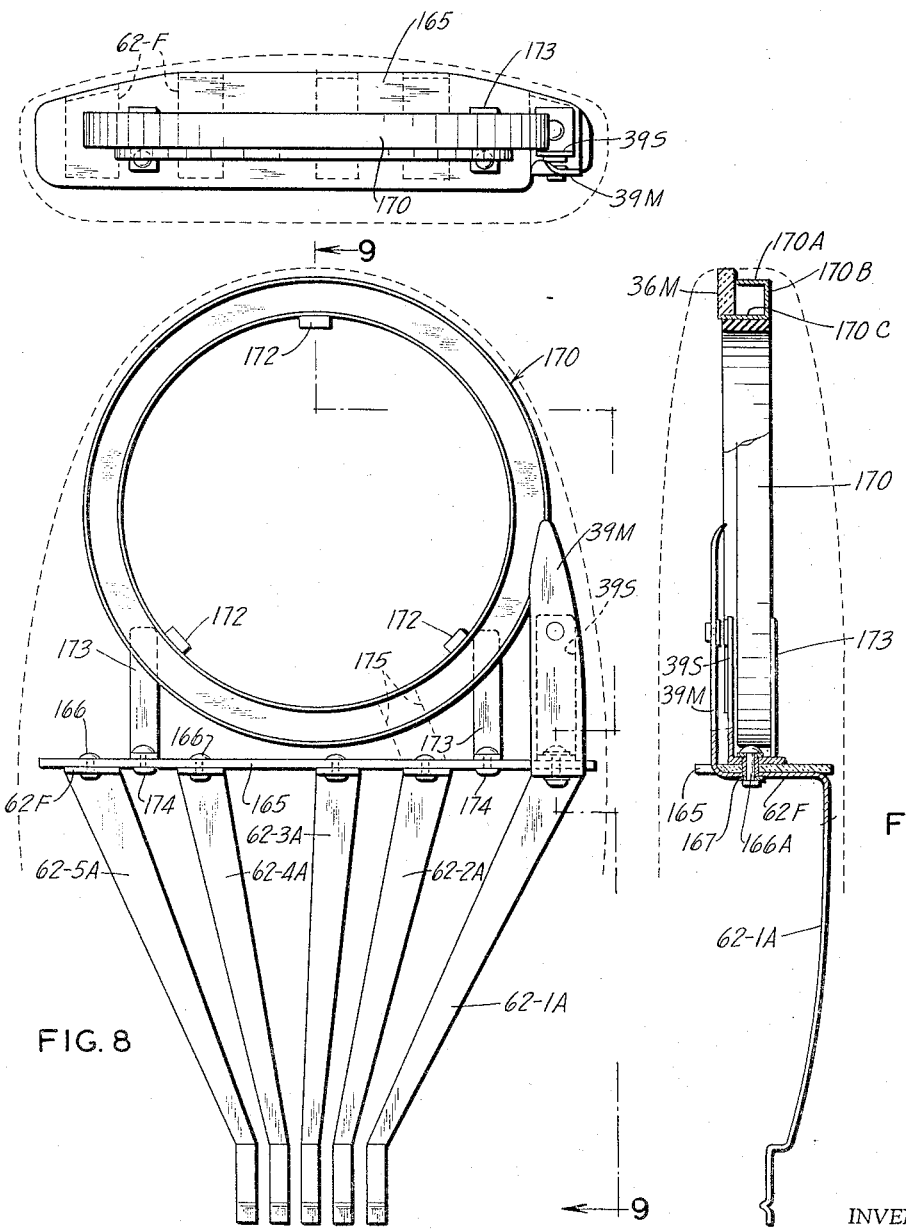

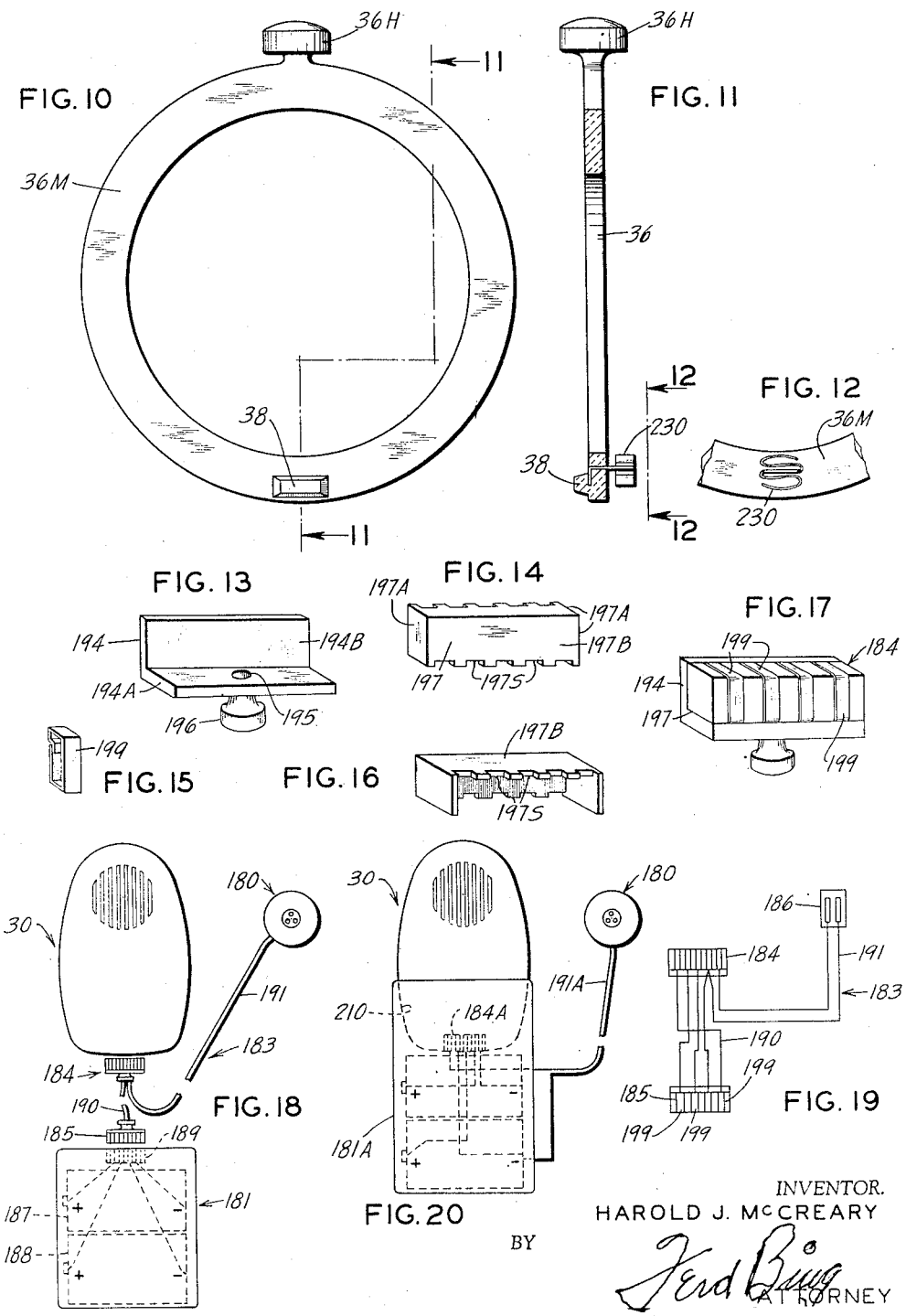

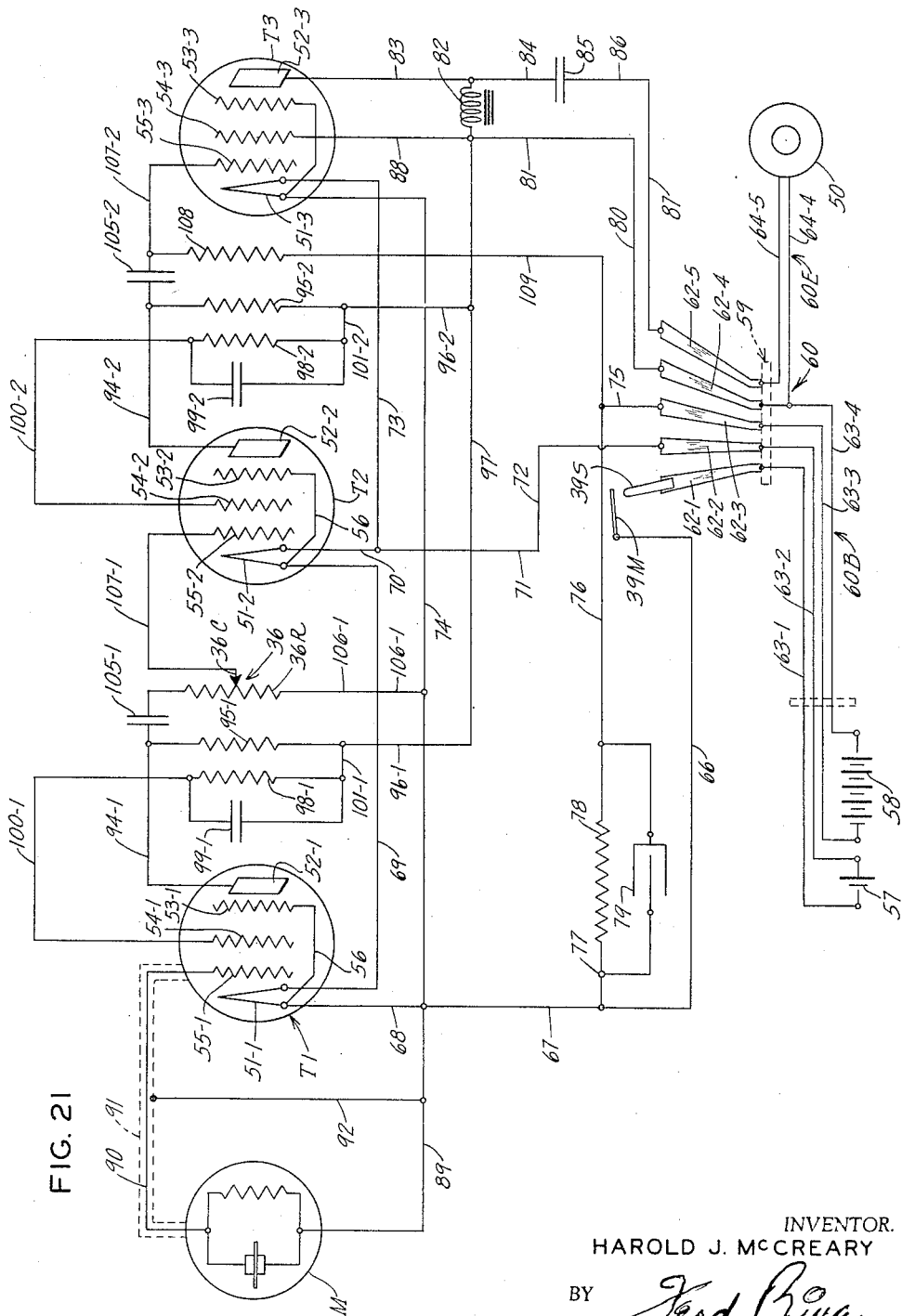

May 22, 1951   H. J. McCREARY   2,554,113
HEARING AID APPARATUS
Filed March 2, 1948   8 Sheets-Sheet 7
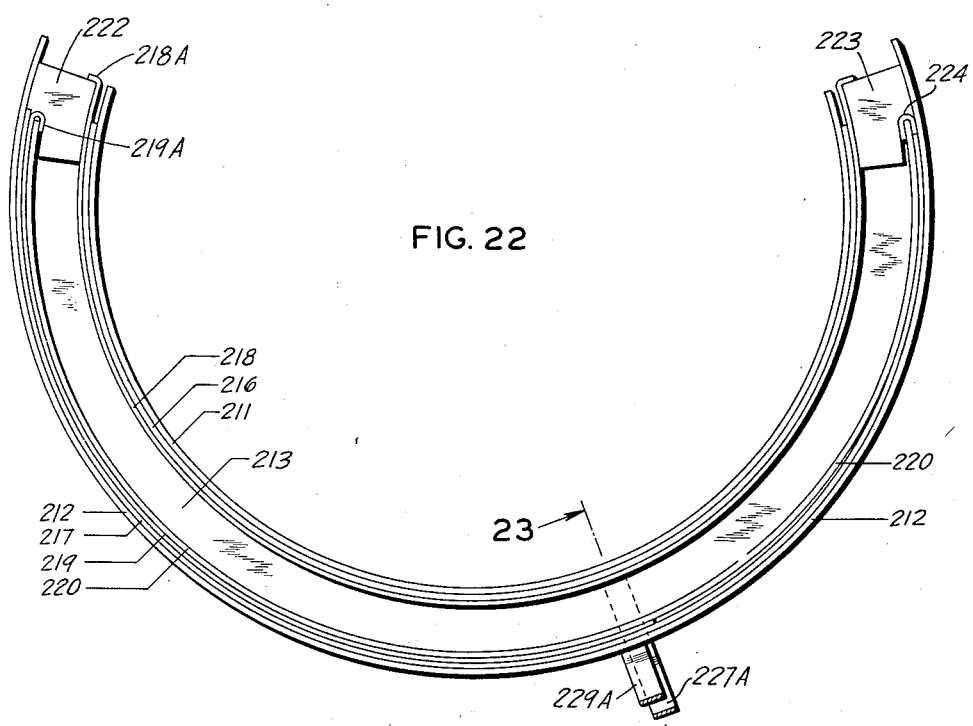
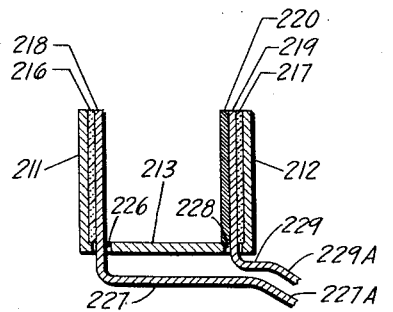
*INVENTOR.*
HAROLD J. McCREARY
BY
*Ferd Boug*
ATTORNEY May 22, 1951    H. J. McCREARY    2,554,113
HEARING AID APPARATUS Filed March 2, 1948    8 Sheets-Sheet 8

INVENTOR.
HAROLD J. McCREARY
BY
*Ford Bing*
ATTORNEY

Patented May 22, 1951

2,554,113

UNITED STATES PATENT OFFICE 2,554,113

HEARING AID APPARATUS

Harold J. McCreary, Lombard, Ill.

Application March 2, 1948, Serial No. 12,561

7 Claims. (Cl. 179—107)

This invention relates to electronic hearing aids and particularly such devices of the compact or pocket type.

An important object of the present invention is to enable extremely small and compact hearing aid assemblies to attain and retain high quality reproduction, and particularly to enable such high quality reproduction to be attained throughout the useful life of the batteries and even when the batteries are approaching the end of their useful life. Another object is to simplify and improve the plug connections required between the amplifier unit and the reproducer and the batteries, and to so form and relate such plug connections that they will uncouple readily, particularly when the cords are caught and jerked inadvertently, and under such circumstances, under the present invention, it is contemplated that the ready uncoupling of the connections will avoid damage to the cords and to the connected elements of the device.

Further important objects are to attain an improved distribution and relation of the elements of the microphone and amplifier unit in such hearing aid devices so as to improve the performance characteristics and simplify the initial assembly as well as the inspection and repair thereof.

Another object of the invention is to enable a hearing aid to be so constructed that adjustment of the potentiometer does not produce the usual microphone noise, and an object related to the foregoing is to enable a potentiometer to be so constructed that such noise that usually occurs in the adjustment of a potentiometer in an amplifier system is eliminated.

Other and further objects of the present invention will be apparent from the following description and claims and are illustrated in the accompanying drawings which, by way of illustration, show preferred embodiments and the principles thereof and what I now consider to be the best mode in which I have contemplated applying those principles. Other embodiments of the invention embodying the same or equivalent principles may be used and structural changes may be made as desired by those skilled in the art without departing from the present invention and the purview of the appended claims.

In the drawings:

Fig. 1 is a top plan view of a primary hearing aid unit constructed in accordance with the present invention;

Fig. 2 is a front elevational view of the unit;

Fig. 3 is a side elevational view of the unit;

Fig. 4 is an elevational view of the internal mechanism in position in the rear section of the casing;

Fig. 5 is a view similar to Fig. 4 showing the relationship of the structural and circuit elements within the casing before the connecting wires have been put in position;

Figs. 6A, 6B, 6C and 6D are views taken respectively along the lines 6A—6A, 6B—6B, 6C—6C and 6D—6D in Fig. 5;

Fig. 7 is a plan view of a chassis arrangement;

Fig. 8 is a front elevational view of this alternative chassis arrangement;

Fig. 9 is an edge view of the chassis arrangement of Figs. 7 and 8;

Fig. 10 is a front elevational view of the operating element for the potentiometer;

Fig. 11 is a sectional view taken along the line 11—11 of Fig. 10;

Fig. 12 is a fragmentary rear elevational view taken from the line 12—12 of Fig. 11;

Figs. 13, 14, 15 and 16 are perspective views of parts of one of the connector plugs;

Fig. 17 is a perspective view of the completed connector plug;

Fig. 18 is a diagrammatic view illustrating the manner in which the units of the apparatus are associated;

Fig. 19 is a schematic view illustrating the plug cord set employed in Fig. 18;

Fig. 20 is a view illustrating the manner in which the battery holder may be directly associated with the main unit of the apparatus;

Fig. 21 is a schematic circuit diagram of the apparatus;

Fig. 22 is a plan view of the potentiometer shown in Fig. 5;

Fig. 23 is a cross sectional view taken along the line 23—23 of Fig. 22;

Figure 24:
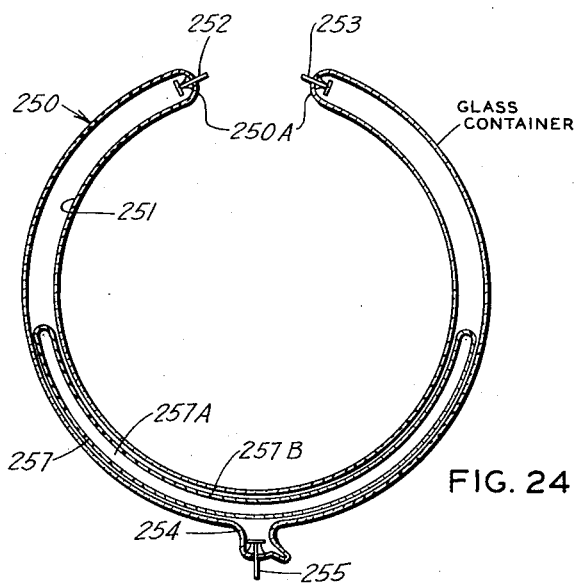
Fig. 24 is a front elevational view of an alternative form of potentiometer.

For purposes of disclosure the invention is herein illustrated as embodied in primary unit 30 having a sectional housing or case 31 within which a microphone M and an electronic amplifier A are housed. The case 31 is elongated and relatively thin and is molded from a suitable plastic material such as a thermoplastic or thermo-setting resin to afford front and rear casing sections 31F and 31R separable along a separation line 32 disposed in a plane substantially parallel to the rear face of the rear section, and these sections are held together by screws S. The rear casing section 31R preferably has a spring clasp C mounted thereon for securing the unit 30 on the user's clothing in an accessible location. The front and rear casing sections 31F and 31R are formed so as to be substantially hollow so as to afford mounting space and locating surfaces for the various circuit elements of the amplifier A and for the microphone M. Under the present invention the elements of the amplifier A with the exception of the control switch means and the volume control means are mounted in a lower or main chamber 34, Figs. 4 and 5, which occupies somewhat more than the lower half of the casing 31, while the microphone M is mounted in the upper portion of the casing opposite a generally circular upper area of the front casing section so as to be disposed opposite and rearwardly of sound-entry slots 35 formed in the front casing section as shown in Fig. 2 of the drawings.

It will be observed that under present invention a potentiometer 36 of either arcuate or annular form is employed and this annular or arcuate potentiometer includes a stationary member such as the arcuate member 36S, Fig. 5, mounted in an annular locating groove 37 formed in the rear casing section 31R adjacent the upper end thereof and in concentric relation with respect to an arcuate upper end edge 31E of the casing 31. Forwardly of and concentric with the stationary member 36S, the potentiometer is provided with an annular adjusting member 36M which is disposed in an upwardly opening slot 31S, Figs. 1 and 3, in the rear section 31R of the casing so that the uppermost portion of the outer surface of the member 36M is exposed and is flush throughout a substantial distance with the arcuate edge 31E of the casing. As will be evident in Figs. 5 and 6B, the inner side of the groove 37 is afforded by a shoulder wall 37W of annular form, and this relatively thin shouldered wall 37W is disposed within the annular adjusting member or ring 36M so as to hold the same in a proper centered relationship while enabling turning movement to be imparted to the ring for control purposes. The annular adjusting member 36M of the potentiometer has a relatively small radially projecting handle 36H whereby the potentiometer may be adjusted and whereby the on-off switch means of the unit may be actuated as will hereinafter be described in detail. The stationary element 36S of the potentiometer is under such an arrangement disposed in what may be termed an embracing relationship with respect to the microphone M, as will hereinafter be described in detail, and the microphone is disposed in a chamber 36C formed in the casing section 31R within the annular wall 37W and in the space within the members 36S and 36M of the potentiometer.

The slot 31S is of such a length, as shown in Fig. 5 that the handle 36H may be moved throughout substantially 180 degrees, and when the volume control handle 36H is in its most counter-clockwise or "off" position indicated by a legend in Fig. 4, a switch operating cam 38 on the forward face of the ring member 36M is engaged with the movable contact 39M of a normally closed control switch 39 that is disposed adjacent and somewhat below the right hand end of the slot 31S as will be evident in Fig. 4. In affording a mounting for the elements thus described, and to afford a substantial separation between the upper and lower chambers of the casing, an upstanding or forwardly projecting wall 40 of generally arcuate form is formed within the rear section 31R, and a relatively wide pedestal 41 is formed adjacent the right hand edge of the section 31R. The upper edges or surfaces of the wall section 40 and 41 are arcuate in form so as to embrace or conform with the lower arcuate edges of the ring 36M of the potentiometer, and between the adjacent ends of the elements 40 and 41, another forwardly projecting pedestal 42 is formed so as to afford a first opening 43 between the wall 40 and the pedestal 42 and a second opening 44 between the pedestals 41 and 42 for the passage of electrical connections as will hereinafter become apparent.

At its lower end the casing section 31R has a downwardly and forwardly opening cavity 45 defined by side walls 46 and a relatively low and notched top wall 47, and when the front section 31F is in place the cavity 45 affords a socket to receive a plug connector means as will hereinafter be described in detail.

As a preliminary to the description of the manner in which the amplifier elements are mounted in the chamber 34, the principal circuit elements and circuit arrangements will be described. Thus the circuit employed is schematically shown in Fig. 21 of the drawings where it will be evident that three amplifier tubes T1, T2 and T3 are employed for amplifying the transduced output of the microphone M and transmitting the amplified output to a conventional receiver or earphone 50 of the kind customarily employed with hearing aid devices. The three tubes are all of the filament type, and have similar elements which are similarly numbered but with a suffix 1, 2 or 3 to distinguish between the elements of the respective tubes. Thus, the tube T1 has a filament 51—1, a plate or anode 52—1, a suppressor grid 53—1, a screen grid 54—1 and a control grid 55—1, the suppressor grid 53—1 being coupled by a wire 56 to the filament 52—1.

In affording operative connections from the amplifier A to the earphone 50, and to the amplifier A from an A-battery 57 and a B-battery 58, a cord set 60 is provided which has a two-wire branch 60E which leads from a main plug 59 to the earphone, and a four-wire branch 60B which leads from the plug 59 to the battery unit that includes the batteries 57 and 58, and while the structural details of such cord set 60 will be described fully hereinafter, the cord set is diagrammatically shown in Fig. 21. The plug 59 is arranged to be inserted into the socket 45 as will hereinafter be described, and when so inserted the contacts of the plug make electrical contact with the lower end portions of five conducting and mounting strips 62—1, 62—2, 62—3, 62—4 and 62—5 which enter into the circuit as will now be described. Thus the strips 62—1 and 62—2 are connected respectively to the negative and positive terminals of the A-battery 57 by means including wires 63—1 and 63—2. Similarly, the strips 62—3 and 62—4 are connected respectively to the negative and positive sides of the B-battery 58 by means including wires 63—3 and 63—4. A wire 64—4 extends from the wire 63—4 to one terminal of the earphone 50, while a wire 64—5 connects the other terminal thereof to the strip 62—5. Thus the several strips 62 constitute power and output terminals within the main or amplifier chamber 34 for connection with the various circuit elements. The strip 62—1 is physically extended to afford one of the contacts such as the stationary contact 39S of the off-on switch 39, while wires 66, 67 and 68 in series extend from the other contact 39M of the switch 39 to one terminal of the filament 51—1. This circuit is extended by a wire 69 from the other terminal of the filament 51—2 of the tube T2. Wires 70, 71 and 72 extend from the other terminal of the filament 51—2 to the strip 62—2, and since the strips 62—1 and 62—2 are connected to opposite terminals of the A-battery 57, a filament heater circuit is thus afforded for the filaments of the tubes T1 and T2, and since the strip 62—2 is connected to the positive terminal of the A-battery, the normal bias of the tube T2 will be greater than that of the tube T1. The heater circuit for the filament 51—3 is afforded by wires 73 and 74 which extend from opposite terminals of the filament 52—3 to the wires 70 and 67, respectively.

The B-battery circuits are afforded by wires 75 and 76 in series which extend from the strip 62—3 to one terminal of a resistor-condenser unit, the other terminal of which is connected by a wire 77 to the wire 67 so as to thereby afford a connection to the filament 51—1 of the tube T1. The resistor-condenser unit just mentioned includes a resistor 78 and an electrolytic condenser 79 in parallel.

The other side of the B-battery circuit is extended from the strip 62—4 to the plates of the several tubes by means including wires 80 and 81 in series, and from the wire 81 a choke 82 and a wire 83 extend the circuit to the plate 52—3 of tube T3. A wire 84 extends from the wire 83 to one terminal of a direct current filter condenser 85, the other terminal of which is connected to the strip 62—5 by wires 86 and 87 in series. Another wire 88 is connected from the wire 81 to the screen grid 54—3, thus completing all of the circuit connections for the tube T3 except to the control grid 55—3 thereof.

As herein shown the microphone M is of the crystal type and one terminal is connected by a wire 89 to the wire 67, while a wire 90 extends from the other terminal of the microphone to the control grid 55—1 of the tube T1. The lead 90 is shielded throughout its length by a shield 91 which is grounded to the wire 89 by a ground lead 92. The plate 52—1 is connected to the positive side of the B-battery by a wire 94—1, a load resistor 95—1, and wires 96—1 and 97 in series to the wire 81. Similarly, the plate 52—2 of the tube T2 is connected by a wire 94—2, load resistor 95—2 and a wire 96—2 in series to the wire 97. The screen grid 54—1 is connected to the positive side of the B-battery by means including a bias resistor 98—1 and a filter condenser 99—1 connected in parallel to afford terminals at opposite ends thereof, and a wire 100—1 connects the screen grid 54—1 with one such end terminal, while a wire 101—1 from the other such end terminal is extended to the wire 96—1. Similarily arranged wires 100—2 and 101—2 extended from opposite ends of a resistor 98—2 and a parallel condenser 99—2 are connected respectively with the screen grid 54—2 and the wire 96—2.

The plate circuit of the tube T1 is capacity-coupled with the control grid 55—2 of the tube T2 by means including a coupling condenser 105—1, one side of which is connected to the wire 94—1 while the other side is connected to one end of the resistance element 36R of the potentiometer 36. The other end of the resistance element 36R is connected by a wire 106—1 to ground as represented by the wire 74. The movable element or contact 36C of the potentiometer is connected by a wire 107—1 to the control grid 55—2 of the tube T2.

Similarly, a coupling condenser 105—2 has one side connected to the wire 94—2, while the other side thereof is connected to one end of a resistor 108, and by a wire 107—2 to the control grid 55—3 of the tube T3. The other end of the resistor 108 is connected by a wire 109 to the wire 76 which, of course, is on the negative end of the resistor 78, and it is the connection thus afforded from the output side or plate circuit of the tube T2 that causes uniformity of reproduction even when the batteries are quite low or worn.

With respect to the assembly of the various elements of the amplifier, and the microphone, and the mounting of such assembly in the rear casing section 31R, it should be observed that the strips 62—1 and 62—5 serve not only as support elements but also as buss bars for enabling common electrical connections to be made in easily accessible locations and in such a manner as to afford short leads. Moreover, strip 62—1 may be readily formed so that one of the contacts of the off-on switch 39 constitutes an integral extension of the strip 62—1, and by fastening this strip to the casing section 31R, a permanent mounting of the amplifier assembly may readily be attained.

As the first step in the convenient assembly process made possible under the present invention, the strips 62—1 to 62—5 are put in position in a jig or fixture which also holds the stationary element of the potentiometer 36 and the microphone M in the relationship that they are to bear to each other when mounted in the housing 31. In this respect it will be observed that the strips 62—1 to 62—5 are of relatively narrow width at their lower ends, Fig. 6, to afford contact elements 62C that extend into the socket 45 as shown in Fig. 6D, and at the upper edge of the socket 45, these narrow contact elements 62C extend between locating lugs 45L formed in the upper wall of the socket 45 as it is afforded by the casing section 36R. Opposite the spaces in between the lugs 45L, a wall 45W on the casing section 31F engages the lugs 45L and extends between the lugs 45L so as to close the upper end of the socket 45 and hold the contacts 62C firmly in position between the lugs 45L. Upwardly of the wall 45W, the strips 62—1 to 62—5 are bent as at 62B, Fig. 6D, so that they will hug the rear face of the chamber 34, and at their upper ends the strips 62—3 to 62—5 are bent or flanged forwardly as at 62F. Suitable undercut notches are formed in the lower face of the wall 40 to be engaged by the ends of the flanges 62F of the strips 62—3 to 62—5, thus to enable these flanges 62F to be snapped into such notches to hold the strips in place in the casing section 31F. It will also be noted that the strips 62—1 to 62—5 diverge from each other, and increase in width from bottom to top, and the strip 62—1 is bent forwardly as at 62D, Fig. 6C, and is then bent back to a parallel relation to form the movable switch contact 39M, Figs. 5 and 6C.

In placing the strips 62—1 to 62—5 in position in the assembly jig, the stationary switch contact 39S is disposed beneath the contact 39M with an intermediate insulating member 115 while a shield 116 and a metal connecting block 117 are put in position on top of the contact 39M. Screws 118 and 119 extend through these members as indicated in Fig. 6C to hold the same in a preliminary assembled relation and to enable them to be fixed to the top or face of the casing element 41 of the casing section 31R.

As a preliminary step in the assmebly, one filament lead from each of the tubes T1 and T2 are soldered together as a group and housed in an insulating sleeve to afford the conductor 69 of Fig. 21, while the other filament lead from the tube T1 is extended across the strip 62—2 and is soldered thereto and is then extended and soldered to one filament lead of the tube T3, the other filaments of the tubes T1 and T3 being soldered to the connecting block 117. These filament leads thus serve as conductors 66 to 74 of Fig. 21. The connector plate or block 117 serves as a soldering point, and the wire that is wrapped about the conduit of the lead wire 90 of the microphone M to afford the shield 91, is soldered to the block 117 so as to thereby be connected to the movable contact 39M on which the block 117 rests. The other end of the shield wire 91 is connected to the one terminal of the microphone M so that the shield 91 serves the function also of the wires 89, 92, 67 and 66.

In a similar manner, the choke 82 and the condenser 85 are disposed just to the right of the tube T3 and the leads therefrom are connected in accordance with Fig. 21, such connection being facilitated by the close physical relationship between these elements and the strips 62—4 and 62—5 with which they are to be connected. The condenser 79 and resistor 78 are similarly disposed in position almost directly over the strip 62—3 and connections according to Fig. 21 are made. The resistors 98—1 and 98—2 and the resistors 95—1 and 95—2 are then associated in parallel with a common lead corresponding to wires 97, 81 and 80 which is extended about the lower end of the condenser 79 and is soldered to the strip 62—4. The other ends of these resistances are then connected to the appropriate leads from the respective tubes as shown in Fig. 21, and these leads in the main may be extended across the tops of the elements previously put in place. The condenser 105—1 may, of course, be soldered to a projecting connecting tab of the potentiometer and to the grid lead from grid 55—2, and the other connections are made in accordance with usual practice, with lacquer applied to the wires and solder points and insulating sleeves placed on those wires that are of any appreciable length.

The microphone, the potentiometer and the amplifier system then constitute a unit which may readily be handled, and upon removal from the assembly jig, may be put in position in the casing section 31R, where it is secured in position primarily by the screws 118 and 119 and by the latching action of the strips 62.

The ring 36M may then be put in place about the guiding wall 36W and with one edge of the ring riding beneath the movable contact 31M, and the assembly may thereupon be completed by fastening the front casing section 31F in place.

In the form of the invention hereinbefore described, the strips 62 were originally separate from each other and became what might be termed a chassis for the assembled amplifier elements by virtue of the assembly operations. These strips 62, however, may be initially associated as a part of a chassis so as to further simplify the assembly of the parts of the apparatus, and such an arrangement is illustrated in Figs. 7 to 9 of the drawings. Thus the strips 62 are illustrated in Figs. 7 to 9 with the suffix A added in each instance and these strips are associated in the relationship which they bear within the casing 31 by means of a connecting plate 165 made from insulating material and shaped as shown in Fig. 7 so as to conform with the internal cross sectional form of the casing 31. The association of the strip 62 with the mounting or connecting insulating plate 165 is attained through the provision of flanges 62F on the upper ends of the strips, and these flanges are disposed against the lower face of the plate 165 and are permanently secured thereto by means of rivets 166. As will be evident in Fig. 9, the strip 62—1A has the upper end thereof extended to form the movable switch member 39M which overlies a stationary spring contact 39S. The stationary contact 39A is formed as a part of an L-shaped metal member and a rivet 166A extends through the bottom of the L-shaped member, the plate 165 and the flange 62F of the member 62—1A, and the rivet 166A has an insulating sleeve and washer arrangement 167 so that the contact 39S is insulated with respect to the member 62—1A.

The insulating plate 165 also serves as a support for a mounting ring 170 that is used to support the microphone M as well as the potentiometer, and this, of course, simplifies the formation of the housing section 31R since it eliminates the necessity for the annular guiding flange 37W. As will be evident in Fig. 9, the annular or ring member 170 is formed as a channel having an outer wall 170A, a base wall 170B and an inner side wall 170C. It will be observed that the inner wall 170C extends forwardly for a greater distance than the wall 170A, and thus the extended portion of the wall 170C serves as a guide or support for the ring 36M. Within the ring 170, a plurality of resilient rubber pads 172 are mounted so as to act as a mounting cup for the microphone M that is disposed within this space in the course of assembly of the unit. The ring 170 is supported in position above the mounting plate 165 by L-shaped brackets 173 that are secured by rivets 174 to the upper face of the mounting plate 165 and are secured as by welding to the rear face of the bottom wall 170B of the ring. The sides or bottom wall of the ring 170 may, of course, be cut away so that connections may be extended therethrough between the electrical elements of the unit, and the location of such a cut away portion is indicated in Fig. 8 by dotted lines 175.

With the unitary chassis that is thus afforded by the structure illustrated in Figs. 7 to 9, the electrical elements of the hearing aid unit may be readily and easily assembled and put in place within the casing 31.

The socket 45 that is incorporated in the lower end of the casing 31 is adapted to receive the connector elements of the cord set or other connecting means, and different forms of cord set and connecting means may be employed, as will be evident upon comparison of Figs. 18 and 19 with Fig. 20. In Fig. 18, the unit 30 is illustrated in diagrammatic association with an earphone 180 and a battery housing 181. The association with these elements is attained through cord set 183 having an amplifier plug 184, a battery plug 185 and an earphone plug 186. The battery case 181 is arranged to enclose an A-battery 187 and a B-battery 188 and in its upper wall this battery case 181 is provided with a socket 189 having appropriate contacts therein associated with the terminals of the A and B batteries and adapted for engagement by the contact elements of the battery plug 185. The amplifier plug 184 and the battery plug 185 are connected by a multi-wire cord 190, while the plug 184 and 186 are connected by a two-wire cord 191, and when the respective plugs are in position in the related sockets, the hearing aid apparatus is in condition for operation.

In accordance with the present invention, the plugs 184 and 185 may be formed in an extremely simple manner that is illustrated in Figs. 13 to 17 of the drawings. Thus the plug such as the plug 184 is formed primarily from a pair of molded members made from insulating material. Thus an insulating base 194 is formed so as to be of angular cross section which affords a base flange 194A and a vertical flange 194B. An opening 195 is formed in the flange 194A and if desired a sleeve 196 may be extended from the lower face of the flange 194A concentric with the opening 195. Another insulating member 197 is formed so as to be of a generally U-shape to afford end flanges 197A and connected by a wall 197B. The opposite edges of the wall 197B are slotted as at 197S and these slots serve as a positioning means to receive and locate a plurality of metal contact elements 199. These contact elements are formed as flat copper strips of a width substantially equal to the width of the slots 197S and of such a length that they may be wrapped around the wall 197B. On the inner face of the wall 197B, the ends of the contact strips are overlapped and soldered together, and in this soldering operation, the leads or wires that are to be connected to the respective contact strips 199 may be soldered thereto. It will be understood that such leads are passed through the sleeve 196 and the opening 195 before such soldering operation, and when the soldering operation has been completed, these wires are drawn in a downward direction through the opening 195 as viewed in Fig. 13 and the member 197 is secured adhesively in position on top of the flange 194A and with the wall 197B parallel to the wall 194B.

As shown in Fig. 20 of the drawings, the unit 30 may be directly mounted in a socket 210 formed in the upper end of a battery case 181A in which A and B batteries are housed. In such an arrangement, the cord set is afforded by connecting the earphone 180 to the battery case by means of a two-wire cord 191A, and the functions of the cord 190 and the plug 184 of Fig. 18 are in this instance served by wiring that is included within the battery case as indicated in Fig. 20. In this instance, a stationary connector plug 184A is afforded in the bottom of the recess 210, thereby to enable the requisite electrical connection to be established as an incident to the insertion of the lower end of the unit 30 into the socket 210.

It has been pointed out hereinbefore that under the present invention different forms of potentiometers may be embodied in the apparatus for operation by an adjustable ring member 36. One form of potentiometer is illustrated in Figs. 5 and 22 and the details of the stationary member 36S of this potentiometer are illustrated in Fig. 22. Thus the stationary member of the potentiometer is afforded by an arcuate brass shell of U-shaped cross section that affords an inner wall 211, an outer wall 212 and a bottom wall 213. At the ends of the bottom wall 213, downwardly turned ears 214 are provided for engagement with slots 215, Fig. 6, in the bottom of the groove 37, this arrangement enabling the stationary element of the potentiometer to be held against displacement along the groove 37. Within the groove or channel afforded by the walls 211, 212 and 213, insulating strips 216 and 217 are positioned against the adjacent faces of the walls 211 and 212 respectively, while a brass contact strip 218 is disposed within the channel and against insulating strip 216. A conductive brass strip 219 extends from the lower portion of the arcuate channel along the insulating strip 219 and to the left-hand end of the channel as will be evident in Fig. 22, and against the conductive strip 219, a carbon strip 220 is mounted so as to extend throughout the entire arcuate length of the channel. This carbon or resistance strip is preferably formed from a sheet of thin plastic material having a facing of carbon on one face and this face is arranged in an opposed relation with respect to the brass strip 218. At the left-hand end of the channel, the strip 219 is folded over and against the carbon facing of the strip 220, and a retaining block 222 is disposed against the folded end 219A and against the strip 218, the strip 218 being bent over as at 218A to hold the block 222 against displacement endwise out of the channel. At the other or left-hand end of the channel, a similar block 223 is positioned and a reversely bent end 218A on the strip 218 engages or is notched into the block to hold the same in position. The block 223 bears against the strip 218 on one side and against a retaining clip 224 that serves to clamp the carbon strip 220 against the side of the channel.

The bottom wall 213 of the channel has an opening 226 therein and an arm 227 formed integrally with the brass strip 218 extends downwardly through the opening 226 and then along the bottom wall 213 so as to afford a projecting terminal 227A. Similarly, an opening 228 is formed beneath the right-hand end of the strip 219, and an integral arm 229 on the strip 219 is extended downwardly through the hole or opening 228 so as to afford a second connecting terminal.

The operation of the potentiometer 36 by the ring 36M is attained by the provision of a movable contact member 230, Figs. 11 and 12, that is fixed on the ring 36M so as to project from the rear face thereof. The spring contact 239 is arranged to bear resiliently against the carbon strip 220 and the brass strip 218 within the groove of the stationary member of the potentiometer and thus the contact 239 serves as a bridging member which varies the effective resistance of the potentiometer as an incident to rocking or rotating movement of the ring 36M.

Figure 26:
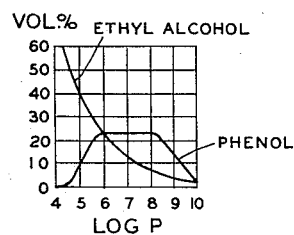
Fig. 26 is a chart illustrating the electrical characteristics of one liquid mixture that may be utilized in the potentiometer of Fig. 24.
Figure 25:
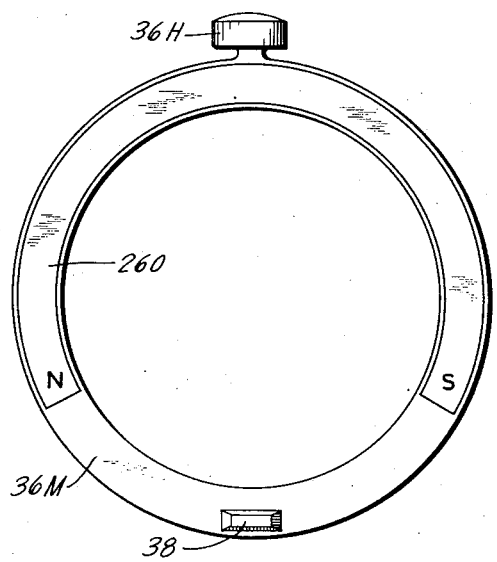
Fig. 25 is a front elevational view of an operating member for the potentiometer of Fig. 24.

In Figs. 24 to 26, another form of potentiometer is illustrated that is particularly adapted for use in the present hearing aid, and this potentiometer enables noise to be eliminated so as to render the hearing aid much more satisfactory in use. The noise that is thus eliminated has been termed the "carbon rattle" or microphone effect that is inherent in carbon strip potentiometers, and in the potentiometer shown in Figs. 24 to 26, this is avoided through the use of a liquid resistor. Thus the potentiometer of Figs. 24 to 26 is afforded by a liquid type container 250 made from a material such as glass to afford an arcuate liquid chamber 251 that extends through nearly a complete circle. The ends of the container 250 are sealed as at 250A, Fig. 24, and contact terminals 252 and 253 are extended through the respective ends of 250. Approximately midway between the ends 250A the container 250 has a lateral extension 254 that houses a contact member 255 whereby an electrical connection may be extended into the tube at this point. The outer surface of the container 250 is silvered to afford electrostatic shielding. Within the tube 250, a shiftable displacement member 257 is mounted, this displacement member being arranged to extend through somewhat less than 180°, and the tube or container 250 is filled with a liquid resistor. Thus by shifting the displacement member 257 about the container 250, the effective resistance between the center contact 255 and either one of the contacts 252 or 253 may be varied. In order to enable the displacement member 257 to be readily shifted, this displacement member is formed from an iron rod 257A and this iron rod is housed and protected from the dielectric liquid by a covering such as a glass covering 257B. The displacement member 257 may thus be influenced magnetically, and in order that this may be done, the ring 36M has an arcuate permanent magnet 260 molded into one face thereof so as to extend in equal amounts in opposite directions from the upper point defined by the handle 36H. If desired, the iron core 257A may also be embodied as a magnet, and hence when the ring 36M of Fig. 25 is disposed opposite the forward face of the potentiometer shown in Fig. 24, the displacement member 257 may be readily and easily shifted within the container 250 so as to vary the effective resistance between the appropriate terminals or contacts of the potentiometer. This is accomplished without the noise that is usually present in devices that are used for this general purpose. This dielectric liquid that is used may be made of the desired resistance to conform with the circuit requirements and the effective cross sectional areas of the potentiometer, and this may be accomplished by reference to the text book entitled "Liquid Dielectrics," translated from the German by Karapetoff. Thus in Fig. 26 a graph is shown wherein the logarithim of "p," the resistance in ohms per cubic centimetre is plotted on a logarithmic scale against percentage of volume of certain liquids. To use this diagram the resistive value required per cubic centimetre of liquid is determined by calculation from the dimensions of the elements of the potentiometer. This resistive value is then laid out on the diagram as a vertical line, and the points at which this line intersects the alcohol line and the phenol line determines the percentages of these liquids to be placed in the solution. One per cent of picric acid is also added to the solution, together with benzene in a quantity sufficient to make 100%. As an example, to obtain a solution having a resistance of one hundred thousand ohms per cubic centimetre, the log of which is 5, the mixture would be:

| | Per cent |
|---|---|
| Ethyl alcohol | 40 |
| Phenol | 10 |
| Picric acid | 1 |
| Benzene | 49 |

In the circuit herein illustrated it has been found that despite the compact arrangement and unusually small size of the present hearing aid unit, high quality performance may be attained by use of the following values for the various circuit elements:

Tube T1, CK505AX, mfgd. by Raytheon
Tube T2, CK505AX, mfgd. by Raytheon
Tube T3, CK506AX, mfgd. by Raytheon
Resistor of microphone M, 5 megohms
Resistor 78, 5000 ohms
Resistor 98—1, 3 megohms
Resistor 98—2, 3 megohms
Resistor 95—1, 500,000 ohms
Resistor 95—2, 500,000 ohms
Resistor 108, 1 megohm
Choke 82, 60 henries
Condenser 85, .02 microfarad
Condenser 105—1, .01 microfarad
Condenser 105—2, .01 microfarad
Condenser 99—1, .01 microfarad
Condenser 99—2, .01 microfarad
Condenser 79, 5 microfarads
Potentiometer, maximum 2 megohms From the foregoing description it will be evident that the present invention affords an improved and simplified hearing aid construction which is not only more simple to assemble, but is also capable of ready inspection and repair. The present device affords a chassis for mounting the circuit elements, and such chassis has its structural elements so formed as to serve as buss bars in the circuit so that other circuit elements may be readily soldered to and supported by such buss bars. Moreover, it will be clear that the present invention enables potentiometer noise to be eliminated, and also simplifies the mounting and operation of the potentiometer in devices of this character.

Hence, while I have illustrated and described the preferred embodiments of my invention it is to be understood that these are capable of variation and modification and I therefore do not wish to be limited to the precise details set forth, but desire to avail myself of such changes and alterations as fall within the purview of the following claims.

I claim:

1. In a hearing aid unit, a sectional case of elongated and relatively flat form and having an arcuate upper edge, said case having a lower amplifier chamber formed therein and also having an upper microphone chamber of circular form and spaced from said arcuate edge, a microphone disposed in said microphone chamber, a stationary potentiometer member comprising an arcuately shaped potentiometer structure disposed about said microphone chamber and at least in part in the space between said microphone chamber and said amplifier chamber, said potentiometer structure including a conductive metal shielding member of channel shaped cross section so as to afford an open side, arcuate contact and resistance strips mounted in insulated and spaced relation along opposite inner sides of said channel shaped shielding member, a movable potentiometer member including a ring member disposed about said microphone chamber and overlying the open side of said stationary potentiometer member, a movable contact fixed on said ring member and extending into said open side of said stationary potentiometer member and between and in engaging relation with said contact and resistance strips, said ring member being concentric with said arcuate edge and being flush with said arcuate edge, means extending from said ring member so as to be accessible along said arcuate edge for imparting adjusting movement to said ring member, amplifier means mounted in said amplifier chamber and operatively associated with said microphone and said potentiometer, switch means for controlling the on-off condition of said amplifier means, and control means on said ring member for governing said switch means.

2. In a hearing aid apparatus, a casing having upper and lower chambers formed therein and having a downwardly opening connecting socket at its lower end below said lower chamber, a chassis disposed in said lower chamber and comprising a plurality of flat metal buss bars arranged in substantially a common plane and having narrow extensions extended into said socket to afford connecting socket contacts, an insulating plate connecting the upper ends of said bars, a microphone and potentiometer support carried by said plate in position to be disposed in said upper chamber, a microphone and a potentiometer mounted on said support, and amplifier components carried on and electrically associated with each other and with said buss bars within said lower chamber to afford an amplifier.

3. In a chassis for a hearing aid apparatus, a plurality of flat resilient metal buss bars disposed in substantially a common plane, said bars being narrow at one end and wide at the other end, and being disposed in a fanned relation so that said bars are substantially equally spaced at all points, narrow extensions at the narrow ends of said bars affording resilient connecting socket contacts, and means connecting said bars mechanically together to maintain the same substantially in said relation.

4. In a chassis for a hearing aid apparatus, a plurality of flat resilient metal buss bars disposed in substantially a common plane, said bars being narrow at one end and wide at the other end, and being disposed in a fanned relation so that said bars are substantially equally spaced at all points, narrow extensions at the narrow ends of said bars affording resilient connecting socket contacts, an insulating connecting plate connecting said bars mechanically together at the wide ends thereof, and a supporting ring carried on said plate for supporting a microphone and a potentiometer.

5. In a chassis for a hearing aid apparatus, a plurality of flat resilient metal buss bars disposed in substantially a common plane, said bars being narrow at one end and wide at the other end, and being disposed in a fanned relation so that said bars are substantially equally spaced at all points, narrow extensions at the narrow ends of said bars affording resilient connecting socket contacts, and an insulating connecting plate disposed normal to said plane and connecting said bars mechanically together at the wide ends thereof.

6. In a chassis for a hearing aid apparatus, a plurality of flat resilient metal buss bars disposed in substantially a common plane, said bars being narrow at one end and wide at the other end, and being disposed in a fanned relation so that said bars are substantially equally spaced at all points, narrow extensions at the narrow ends of said bars affording resilient connecting socket contacts, an insulating connecting plate connecting said bars mechanically together at the wide ends thereof, and a supporting ring of U-shaped channel cross section carried on said plate with the open side of said U-shaped channel facing in a direction normal to said plane for supporting an element of a potentiometer in said channel.

7. In a hearing aid apparatus, a casing having upper and lower chambers formed therein and having a downwardly opening connecting socket at its lower end below said lower chamber, a microphone in said upper chamber, a chassis disposed in said lower chamber and comprising a plurality of flat buss bars of resilient metal arranged in substantially a common plane and having narrow extensions extended into said socket to afford connecting socket contacts, means affording an off-on switch associated with the one of said bars that is adjacent one edge of said casing, a first amplifier tube disposed over said bars adjacent said switch, other amplifier tubes disposed over said other bars, and other amplifier components disposed over and between said tubes and carried on and electrically associated with said tubes and said buss bars within said lower chamber to afford an amplifier.

HAROLD J. McCREARY.

REFERENCES CITED

The following references are of record in the file of this patent:

UNITED STATES PATENTS

| Number | Name | Date |
|---|---|---|
| 1,356,634 | Koch | Oct. 26, 1920 |
| 1,541,817 | Humm | June 16, 1925 |
| 1,992,304 | Handforth | Feb. 26, 1935 |
| 2,290,816 | Schauer | July 21, 1942 |
| 2,327,320 | Shapiro | Aug. 17, 1943 |
| 2,386,705 | Merrill | Oct. 9, 1945 |
| 2,408,556 | Hasenwinkle | Oct. 1, 1946 |
| 2,444,302 | Lyberger | June 29, 1948 |

FOREIGN PATENTS

| Number | Country | Date |
|---|---|---|
| 517,555 | Great Britain | Feb. 1, 1940 |
| 683,464 | France | Mar. 3, 1930 |